Aug. 25, 1953
F. C. NOVELLO
2,650,243
OXY-PHENYL CYCLOHEXANE-AND CYCLOHEXENE-CARBOXYLIC
ACIDS AND DERIVATIVES
Filed May 10, 1951
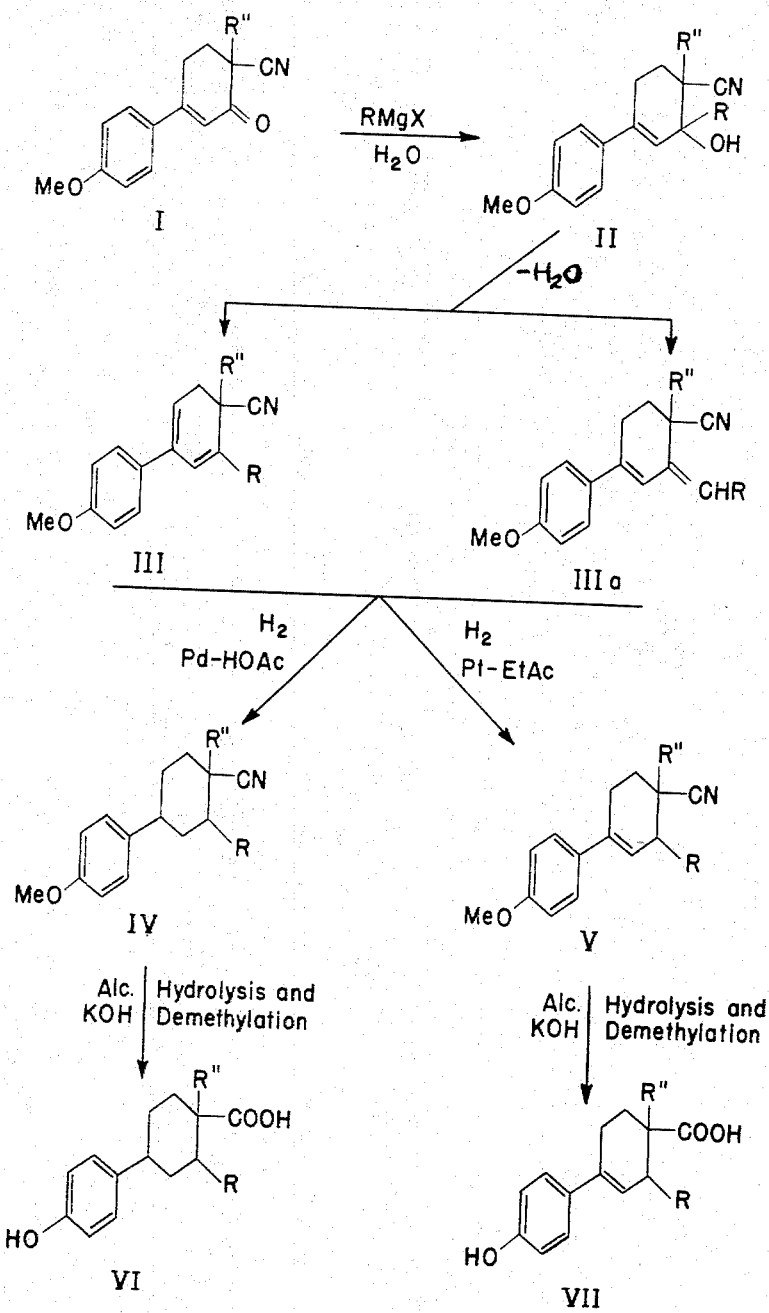
INVENTOR.
FREDERICK C. NOVELLO
BY
ATTORNEY Patented Aug. 25, 1953

2,650,243

UNITED STATES PATENT OFFICE 2,650,243

OXY-PHENYL CYCLOHEXANE- AND CYCLOHEXENE-CARBOXYLIC ACIDS AND DERIVATIVES

Frederick C. Novello, Prospect Park, Pa., assignor to Merck & Co., Inc., a corporation of New Jersey Application May 10, 1951, Serial No. 225,484

6 Claims. (Cl. 260—520)

This invention is concerned with certain new chemical compounds. More particularly it is concerned with 3-(p-substituted phenyl)-cyclohexanes and cyclohexenes in which the phenyl substituent is chosen from the group consisting of hydroxy, methoxy and benzoxy and various substituents occur in the cyclohexane and cyclohexene rings.

The compounds of the invention can be represented by the following formulae:

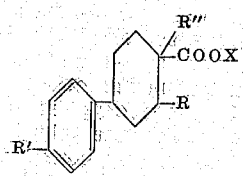

and

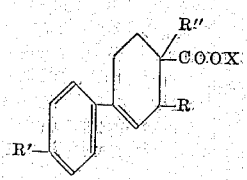

in which R and R'' are lower alkyl and R' is chosen from the group consisting of hydroxy, methoxy, lower acyloxy and benzoxy, and X is chosen from the group consisting of hydrogen and lower alkyl.

The compounds of the invention are prepared according to the series of reactions as illustrated in the flow sheet. Thus, starting with an appropriate 3-(p-methoxyphenyl)-6-alkyl-6-cyanocyclohexen-2-one-1 (I) (the preparation of which is described in my co-pending applications Serial No. 206,730 filed January 18, 1951, and entitled 3-(p-substituted phenyl)-cyclohexanols) by reaction with a Grignard reagent of the formula RMgX there is produced 3-(p-methoxyphenyl)-1,6-dialkyl-6-cyanocyclohexen-2-ol-1 (II). These compounds can be dehydrated by known methods to yield a variety of 3-(p-methoxyphenyl)-1,6-dialkyl-6-cyanocyclohexadienes (III). It will be understood that where R is a primary or secondary alkyl radical containing 2 or more carbon atoms the conjugated system may be as shown for structure III or it may be exocyclic as in IIIa. Upon catalytic hydrogenation with palladium catalyst and acetic acid, III and IIIa are converted to 3-(p-methoxyphenyl)-1,6-dialkyl-6-cyanocyclohexanes (IV). On the other hand, if the catalytic hydrogenation of the above compounds is carried out with platinum catalyst and ethyl acetate, partial reduction of the diene takes place and there is obtained 3-(p-methoxyphenyl)-1,6-dialkyl-6-cyanocyclohexene-2 (V). It is to be realized that the hydrogenation of IIIa according to the procedure just described can give rise to cyclohexenes exhibiting meta-isomerism. Hydrolysis of the nitrile groups of the cyclohexane and cyclohexene compounds, thus prepared, is accomplished by treatment with alcoholic potassium hydroxide at elevated temperature; this reaction is accompanied by simultaneous demethylation of the methoxy substituent and there is thus obtained 3-(p-hydroxyphenyl)-1,6-dialkyl-6-carboxycyclohexane (VI) and 3-(p-hydroxyphenyl)-1,6-dialkyl-6-carboxycyclohexene-2 (VII).

The p-methoxy-homologues of VI and VII are prepared by methylation of these compounds with methyl sulfate and alkali. Similarly the p-benzoxy-homologues are prepared by the benzoylation of these compounds with benzoyl chloride in pyridine. Further the p-acyloxy-homologues are prepared by the acylation of the above compounds with acyl chlorides.

Further, having obtained the various carboxylic acids above described, these can be esterified by reaction with an appropriate alcohol according to known methods.

The compounds of this invention possess estrogenic activity.

Example 1—Preparation of 3-(p-hydroxyphenyl)-6-carboxy-1,6-dimethylcyclohexane.—3-(p-methoxyphenyl)-6-cyano-1,6-dimethylcyclohexen-2-ol-1 was prepared as follows: A filtered solution of methyl magnesium iodide in 100 ml. ether, prepared from 2.443 grams (0.1 mole) of magnesium and 14.2 grams (0.1 mole) of methyl iodide, was added dropwise with stirring over a ten minute period to a solution of 4.8 (0.02 mole) of 3-(p-methoxyphenyl)-6-cyano-6-methylcyclohexen-2-one-1 in 20 ml. benzene and 60 ml. ether at room temperature. The mixture was refluxed for one and one-half hours. The mixture was cooled and poured onto a mixture of 100 grams ice and 25 ml. dilute hydrochloric acid. The organic layer was separated and the aqueous layer was extracted with 100 ml. ether and the ether extract added to the organic layer. The organic layer was extracted twice with 25 ml. portions water, one 25 ml. portion 5% sodium thiosulphate solution, one 25 ml. water, one 25 ml. portion 5% sodium bicarbonate solution, and dried over anhydrous sodium sulphate. The sodium sulphate was removed by filtration, and the ether was removed by distillation. The residue was crystallized from ether-petroleum ether. There were obtained colorless needles of 3-(p-methoxyphenyl)-6-cyano-1,6-dimethylcyclohexen-2-ol-1.

3 - (p-methoxyphenyl) - 6 - cyano - 1,6 - dimethylcyclohexadiene-1,3 was prepared as follows: 5.0 grams (0.02 mole) of the above prepared cyclohexenol was mixed intimately with 1 gram potassium acid sulphate and the mixture was distilled in vacuo, 0.5 mm. There was obtained 3.6 grams of the desired product, which was crystallized from methanol. The product was obtained as colorless needles, M. P. 87–90° C.

2.9 grams (0.012 mole) of this cyclohexadiene was dissolved in 25 ml. glacial acetic acid and shaken under an atmosphere of hydrogen at room temperature and atmospheric pressure in the presence of 150 mg. of palladium black. When uptake of hydrogen ceased, the catalyst was removed by filtration and the filtrate concentrated to dryness in vacuo. The residue was taken up in 200 ml. ether. The ether solution was washed twice with 25 ml. portions water and dried over anhydrous sodium sulphate. The sodium sulphate was removed by filtration and the ether by evaporation on a steam-bath. The residue was distilled in vacuo. There was obtained 3-(p-methoxyphenyl)-6-cyano-1,6-dimethylcyclohexane, a colorless oil.

4.4 grams (0.02 mole) of this cyclohexane, 20 grams potassium hydroxide, and 50 ml. methanol were heated in a steel bomb at 210° C. for thirty-six hours with shaking.

The contents of the bomb were cooled and the methanol removed by evaporation to dryness. The residue was taken up in 100 ml. water and acidified with dilute hydrochloric acid. There resulted a solid precipitate which was extracted with 200 ml. ether. The ether layer was washed twice with 50 ml. portions water and dried over anhydrous sodium sulphate. The sodium sulphate was removed by filtration and the ether by evaporation. The residue was crystallized from benzene-hexane. There was obtained the desired product 3-(p-hydroxyphenyl)-6-carboxy-1,6-dimethylcyclohexane M. P. 192–193° C.

*Example 2—Preparation of 3-(p-hydroxyphenyl) - 6 - carboxy - 1 - ethyl - 6 - methylcyclohexane.*—Following the procedure outlined in Example 1 and substituting for the methyl magnesium iodide there used an equimolar quantity of ethyl magnesium iodide there was obtained 3 - (p - hydroxyphenyl) - 6 - carboxy - 1 - ethyl-6-methylcyclohexane, B. P. 135–145° C. at 1 micron pressure.

*Example 3—Preparation of 3-(p-hydroxyphenyl) - 6 - carboxy - 1,6 - dimethylcyclohexene-2.*—3 - (p - methoxyphenyl) - 6 - cyano - 1,6-dimethylcyclohexadiene-1,3 (prepared as in Example 1) (4.8 grams, 0.02 mole) was dissolved in 100 ml. ethyl acetate. To this mixture there was added 500 mg. Adams' catalyst and the mixture was shaken under an atmosphere of hydrogen at atmospheric pressure at room temperature. When hydrogen uptake ceased, the catalyst was removed by filtration and the ethyl acetate by distillation to dryness in vacuo. The residue was distilled in vacuo yielding a pale yellow oil which was recrystallized from methanol. There was obtained colorless flakes of 3-(p-methoxyphenyl)-6-cyano-1,6-dimethylcyclohexene-2, M. P. 128.5–130° C.

This cyclohexene was treated with alcoholic potassium hydroxide in a bomb as described in Example 1. There was obtained the desired product 3-(p-hydroxyphenyl)-6-carboxy-1,6-dimethylcyclohexene-2.

*Example 4—Preparation of 3-(p-hydroxyphenyl) - 6 - carboxy - 1 - ethyl - 6 - methylcyclohexene-2.*—Following the procedure outlined in Example 1 and substituting for the methyl magnesium iodide there used an equimolar quantity of ethyl magnesium iodide there was obtained a mixture of 3-(p-methoxyphenyl)-6-cyano-1-ethyl-6-methylcyclohexadiene-1,3 and 3-(p-methoxyphenyl) - 6 - cyano - 1 - ethylidene - 6 - methylcyclohexene-2. Following the hydrogenation and hydrolysis procedure outlined in Example 3, there was obtained 3-(p-hydroxyphenyl)-6-carboxy-1-ethyl-6-methylcyclohexene-2.

*Example 5—Preparation of 3-(p-methoxyphenyl) - 6 - carboxy - 1,6 - dimethylcyclohexane.*—3-(p - hydroxyphenyl) - 6 - carboxy - 1,6 - dimethylcyclohexane (obtained as in Example 1) was dissolved in aqueous sodium hydroxide and the solution cooled. There was added dropwise and with stirring an equimolar quantity of dimethyl sulphate. The mixture was then heated on a steam-bath for approximately one hour after which it was cooled and acidified with dilute hydrochloric acid. The solid precipitate was extracted with ether, the ether layer washed twice with water and dried over anhydrous sodium sulphate. The sodium sulphate was removed by filtration, the ether by evaporation to dryness and the product was recrystallized from benzene-hexane. There was obtained 3-(p-methoxyphenyl)-6-6-carboxy-1,6-dimethylcyclohexane.

Similarly, following the above procedure and starting with 3-(p-hydroxyphenyl)-6-carboxy-1-ethyl-6-methylcyclohexane (obtained as in Example 2), 3-(p-hydroxyphenyl)-6-carboxy-1,6-dimethylcyclohexene-2 (obtained as in Example 3), and 3-(p-hydroxyphenyl)-6-carboxy-1-ethyl-6-methylcyclohexene-2 (obtained as in Example 4), there was obtained 3-(p-methoxyphenyl)-6-carboxy-1-ethyl-6-methylcyclohexane, 3-(methoxyphenyl) 6 - carboxy - 1,6 - dimethylcyclohexene-2, and 3-(p-methoxyphenyl)-6-carboxy-1-ethyl-6-methylcyclohexene-2 respectively.

*Example 6—Preparation of 3(p-hydroxyphenyl) - 1 - butyl - 6 - carboxy - 6 - methylcyclohexane.*—Following the procedure outlined in Example 1 and substituting for the methyl magnesium iodide there used an equimolar quantity of butyl magnesium iodide there was obtained 3 - (p - hydroxyphenyl) - 1 - butyl - 6 - carboxy-6-methylcyclohexane.

*Example 7—Preparation of 3-(p-hydroxyphenyl) - 6 - carboxy - 6 - ethyl - 1 - methylcyclohexane.*—3 - (p - hydroxyphenyl) - 6 - carbethoxy-6-ethyl-cyclohexene-2-one-1 was prepared as follows: 20.5 grams (0.13 mole) ethyl ethylacetoacetate in 25 ml. dry benzene was added dropwise and with stirring to a cooled suspension of 5 grams (0.13 mole) of potassium in 75 ml. dry benzene. When all of the potassium had reacted 150 ml. dioxane was added. The solution was cooled in ice and 15 grams (0.065 mole) β-dimethylamino-p-hydroxypropiophenone hydrochloride was added. The mixture was stirred at room temperature for approximately three hours and then heated on a steam-bath for approximately three hours. The mixture was cooled in ice and treated with dry hydrogen chloride gas for approximately one-half hour. There was added 200 ml. water and the solution extracted with 500 ml. ether. The organic layer was washed twice with 100 ml. portions water, dried over anhydrous sodium sulphate and the sodium sulphate removed by filtration. The solution was evaporated to dryness and the residue distilled in vacuo. The distillate was crystallized from acetone-petroleum ether and there was obtained the desired product.

This product was methylated by dissolving it in aqueous alkali, cooling this solution and adding thereto an equimolar quantity of dimethyl sulphate. The product was obtained by extraction with ether and removal of the ether by evaporation, and crystallization from acetone-petroleum ether. There was obtained 3-(p-methoxyphenyl) - 6 - carbethoxy - 6 - ethylcyclohexene-2-one-1.

Using this cyclohexenone as a starting material and following the procedure outlined in Example 1 there was obtained the desired product 3 - (p - hydroxyphenyl) - 6 - carboxy - 6 - ethyl-1-methylcyclohexane.

Similarly, by variation of the active methylene compound (i. e. ethyl ethylacetoacetate above) and using the thus obtained cyclohexene-2-one-1 in the foregoing examples there are obtained a variety of 3-(p-hydroxyphenyl- and 3-(p-methoxyphenyl) - 6 - carboxy - 1,6 - dialkylcyclohexanes and -cyclohexane-2's.

For example, 3-(p-methoxyphenyl)-6-carboxy-1-ethyl-6-isopropylcyclohexane was prepared by using ethyl isopropylacetate in place of the ethyl ethylacetoacetate above described and following the procedure outlined in Example 5.

*Example 8—Preparation of 3 - (p - hydroxyphenyl) - 6 - carbomethoxy - 1,6 - dimethylcyclohexane.*—3 - (p - hydroxyphenyl) - 6 - carboxy-1,6-dimethylcyclohexane (obtained as in Example 1) was treated with acetic anhydride containing one drop of concentrated sulfuric acid. From this mixture there was obtained 3-(p-acetoxyphenyl) - 6 - carboxy - 1,6 - dimethylcyclohexane which was treated with an ethereal solution of diazomethane. When nitrogen evolution ceased, the solution was evaporated to dryness and the residue hydrolized with 5% aqueous sodium hydroxide. The alkaline solution was acidified with dilute hydrochloric acid and the resulting precipitates taken up in an equal volume of ether. The ethereal solution was evaporated to dryness and the residue crystallized from acetone-petroleum ether. There was obtained the desired product 3-(p-hydroxyphenyl)-6-carbomethoxy-1,6-dimethylcyclohexane.

Similarly, the various 3-(p-hydroxyphenyl)-6-carboxy-1,6-dialkylcyclohexanes and -cyclohexene-2's above described can be esterified by this procedure. Thus, diazomethane will yield the methyl ester and diazoethane the ethyl ester.

Further, 3-(p-methoxyphenyl)-6-carboxy-1,6-dialkylcyclohexanes and -cyclohexene-2's (obtained as described in Example 5) can be esterified by treatment with diazomethane or diazoethane to yield the various methyl and ethyl esters respectively.

The p-lower acyloxy- and p-benzoxy- derivatives of the esters of the invention are obtained by treating the p-hydroxy- esters with an acyl chloride or benzoyl chloride.

What is claimed is:

1. A compound chosen from the class consisting of

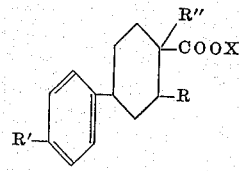

and

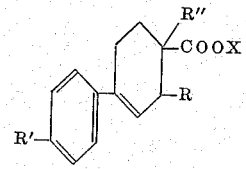

in which R and R'' are lower alkyl, R' is chosen from the class consisting of hydroxy, methoxy, benzoxy and lower acyloxy; and X is chosen from the group consisting of hydrogen and lower alkyl.

2. 3 - (p - hydroxyphenyl) - 6 - carboxy - 1,6-dimethylcyclohexane.

3. 3 - (p - hydroxyphenyl) - 6 - carboxy - 1-ethyl-6-methylcyclohexane.

4. 3 - (p - hydroxyphenyl) - 6 - carboxy - 1,6-dimethylcyclohexene-2.

5. 3 - (p - hydroxyphenyl) - 6 - carboxy - 1-ethyl-6-methylcyclohexene-2.

6. 3 - (p - methoxyphenyl) - 6 - carboxy - 1-ethyl-6-methylcyclohexane.

FREDERICK C. NOVELLO.

References Cited in the file of this patent

UNITED STATES PATENTS

| Number | Name | Date |
|---|---|---|
| 2,496,064 | Natelson et al. | Jan. 31, 1950 |
| 2,582,253 | Hogg et al. | Jan. 15, 1952 |

OTHER REFERENCES

Rubin et al., Chem. Abstracts, vol. 40, p. 2118 (1946).